United States Patent [19]
Haydu

[11] 3,780,837
[45] Dec. 25, 1973

[54] SINGLE CYLINDER TRUCK-MOUNTED BRAKE

[75] Inventor: Andrew G. Haydu, Pittsburgh, Pa.

[73] Assignee: Westinghouse Air Brake Company, Wilmerding, Pa.

[22] Filed: Nov. 13, 1972

[21] Appl. No.: 305,858

[52] U.S. Cl.................... 188/195, 188/52, 188/107
[51] Int. Cl............................................. B60t 8/22
[58] Field of Search...................... 188/52, 59, 167, 188/153 R, 195; 303/22 R, 23 R

[56] References Cited
UNITED STATES PATENTS

| | | | |
|---|---|---|---|
| 2,958,398 | 11/1960 | Newell | 188/52 |
| 2,966,963 | 1/1961 | Williams | 188/52 |
| 3,207,271 | 9/1965 | Polanin et al. | 188/195 |
| 3,386,533 | 6/1968 | Taylor et al. | 188/195 X |

FOREIGN PATENTS OR APPLICATIONS

| 9,154 | 4/1904 | Great Britain | 188/52 |
|---|---|---|---|

Primary Examiner—Duane A. Reger
Attorney—Ralph W. McIntire, Jr. et al.

[57] ABSTRACT

A brake rigging for a two-axle four-wheel railway car truck which embodies a brake cylinder disposed traversely between the side frames of the car truck and operatively connected to two parallel brake beams disposed on the respective opposite sides of a truck bolster through a linkage comprising a pair of spaced-apart bell-crank levers pivotally mounted on one of the brake beams, one arm of these bell-crank levers being pivotally connected respectively to the body of the brake cylinder and the exterior end of the piston rod of the brake cylinder piston, and the other arm of these levers being pivotally connected respectively to one end of one of a pair of rods, the other end of each of which is pivotally connected to the other brake beam. The traversely disposed brake cylinder, together with the pair of spaced-apart bell-crank levers, insure that the pair of rods connecting these levers to the other brake beam are so spaced apart one from the other as to be sufficiently disposed beneath the truck bolster adjacent the outer ends thereof as to enable adequate vertical movement of the bolster, as the result of truck spring deflection due to load on the car, without movement of the bolster into contact with these rods which would inhibit or prevent free movement thereof. Therefore, while the car is either empty or fully loaded, whenever fluid under pressure is supplied to the brake cylinder, the two brake beams are moved in opposite directions without hindrance by the bolster to cause the application of brake shoes carried by the brake beams to the tread surface of each wheel of the car truck with the same-brake applying force.

12 Claims, 3 Drawing Figures

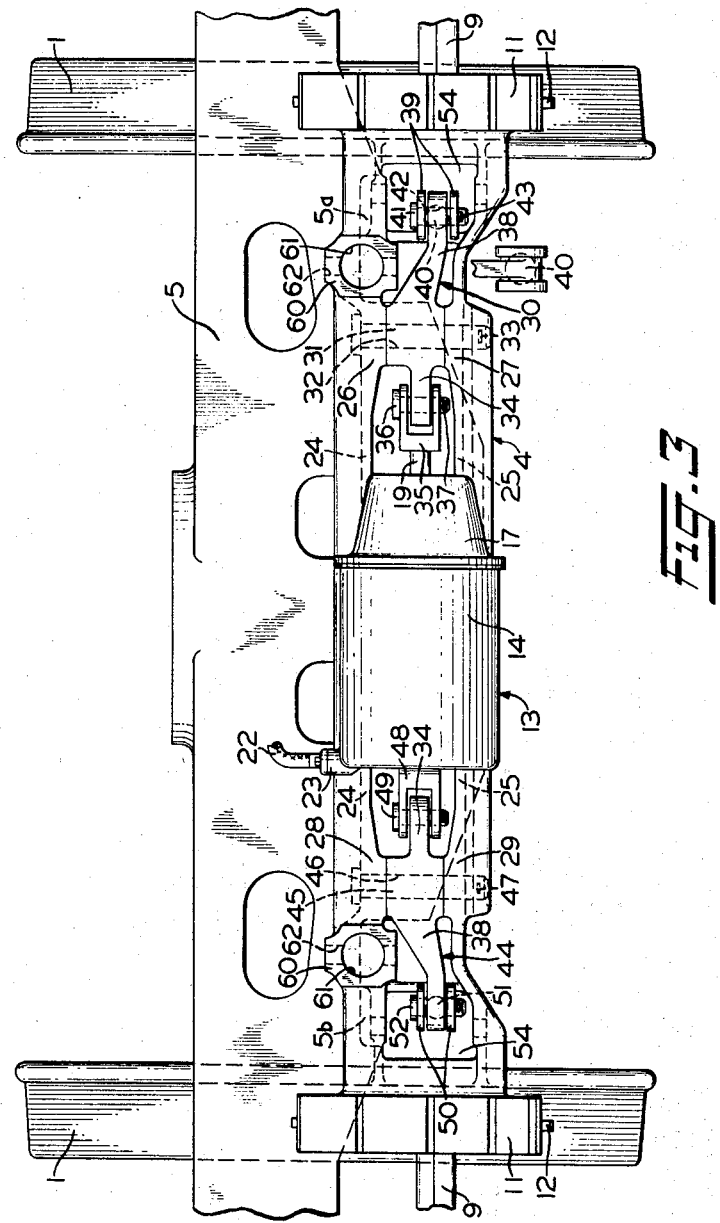

3,780,837

SINGLE CYLINDER TRUCK-MOUNTED BRAKE

BACKGROUND OF THE INVENTION

In U.S. Pat. No. 3,406,791, issued Oct. 22, 1969 to Samuel L. Williams, and assigned to the assignee of the present application, there is shown a brake rigging for a two-axle four-wheel railway car truck that includes two brake beams one of which carries thereon a brake cylinder, the piston rod of which extends through windows in a bolster and the other brake beam and is pivotally connected to one end of a force equalizing lever that is pivotally mounted midway its ends on a fulcrum member secured to the other brake beam. Operatively connected to the other end of this lever is one end of a link that extends through windows in both brake beams and in the bolster and has its other end pivotally connected to the one brake beam at one side of the point midway its ends at a location that is substantially the same distance from this midpoint as the location of the longitudinal center line of the brake cylinder carried by this one brake beam is on the other side of this point midway the ends of this brake beam.

Since the bolster of a railway car truck is supported at its opposite ends on the car truck springs, the bolster moves vertically downward as the load on the car increases. Therefore, it is apparent that, as the bolster moves downward as the result of the load placed upon the car, the peripheral surface of the windows in the bolster is moved toward the piston rod and the link that extends through these windows. If the load placed on the car is sufficient to cause the peripheral surface of these windows to be moved into abutting relationship with the piston rod and the link, it is apparent that their free movement is impaired or prevented when a brake application is effected. It can be readily understood that any interference with the free movement of the piston rod and the link at the time of effecting a brake application is most undesirable.

Moreover, the longitudinal axis of the brake cylinder shown in U.S. Pat. No. 3,406,791 is parallel to the longitudinal axis of the car truck. Consequently, the length of this brake cylinder is limited to a value that is somewhat less than the distance between the brake beam and the car axle of the truck. Therefore, the length of the bore in the casing of the brake cylinder cannot be of such magnitude as to provide sufficient travel for the brake cylinder piston, in addition to that required to effect contact of the brake shoes with the tread surface of the wheels, that, as the brake shoes wear away, the shoes are always properly moved into braking contact with the tread surface of the wheels of the truck during each brake application throughout their useful life without the necessity of a slack adjuster to compensate for wear of the shoes.

Accordingly, it is the general purpose of the present invention to provide a novel brake rigging for a two-axle four-wheel railway car truck having a single brake cylinder disposed transversely between the side frames of the truck on the axle side of one of two parallel brake beams arranged on opposite sides of the truck bolster and operatively connected to the two brake beams through a linkage that includes a pair of bell-crank levers pivotally mounted on one brake beam and a pair of spaced-apart links connecting these bell-crank levers to the other brake beam, these links being sufficiently disposed below the truck bolster adjacent the respective opposite ends thereof as to enable free movement of these links irrespective of the load on the car whenever a brake application is effected without interference by the bolster.

SUMMARY OF THE INVENTION

According to the present invention, a novel brake rigging for a two-axle four-wheel railway car truck comprises a brake cylinder transversely disposed between the side frames of a car truck and operatively connected to a pair of parallel brake-shoe-carrying brake beams disposed on the respective opposite sides of the truck bolster through a linkage that comprises a pair of spaced-apart bell-crank levers, each pivotally mounted at the junction of its arms on one of the brake beams, and a pair of spaced-apart links or rods that extend beneath the truck bolster adjacent the outer ends thereof. Adjacent its outer end, one arm of one bell-crank lever is pivotally connected to the body of the brake-cylinder, and the corresponding arm of the other bell-crank lever is pivotally connected adjacent its outer end to the exterior end of the piston rod of the brake cylinder piston. Adjacent its outer end, the other arm of each of the bell crank levers is respectively pivotally connected to one end of one of the pair of spaced-apart links that are disposed beneath the bolster. The other end of each of these links is pivotally connected to the other of the pair of brake beams. The configuration of the bell-crank levers and the links is such that these spaced-apart links, which extend beneath the bolster adjacent its respective opposite ends, are at such a location below the bolster as to enable adequate vertical downward movement of this bolster, as the result of the deflection of the car springs in response to fully loading the car, without movement of the bolster into contact with the links which, should this occur, would inhibit or even prevent movement of these links if fluid under pressure were supplied to the brake cylinder while the car is fully loaded.

By so locating the brake cylinder transversely between the truck side frames, its length may be such as to provide that the travel of the piston of this cylinder, in addition to that required to effect contact of the brake shoes with the tread surface of the wheels, is sufficient that, as the brake shoes wear away, these shoes are always properly moved into braking contact with the tread surface of the wheels of the truck during each brake application throughout their useful life without the necessity of a slack adjuster to compensate for wear of the shoes.

In the accompanying drawings:

FIG. 3 is a vertical cross-sectional view, taken along the line 3—3 of FIG. 1 and looking in the direction of the arrows, with the hand brake linkage and wheels omitted to show certain details of the brake beam and the truck bolster not made apparent in FIGS. 1 and 2 whereby the hand brake linkage may be pivotally mounted on the brake beams.

DESCRIPTION

Figure 1:
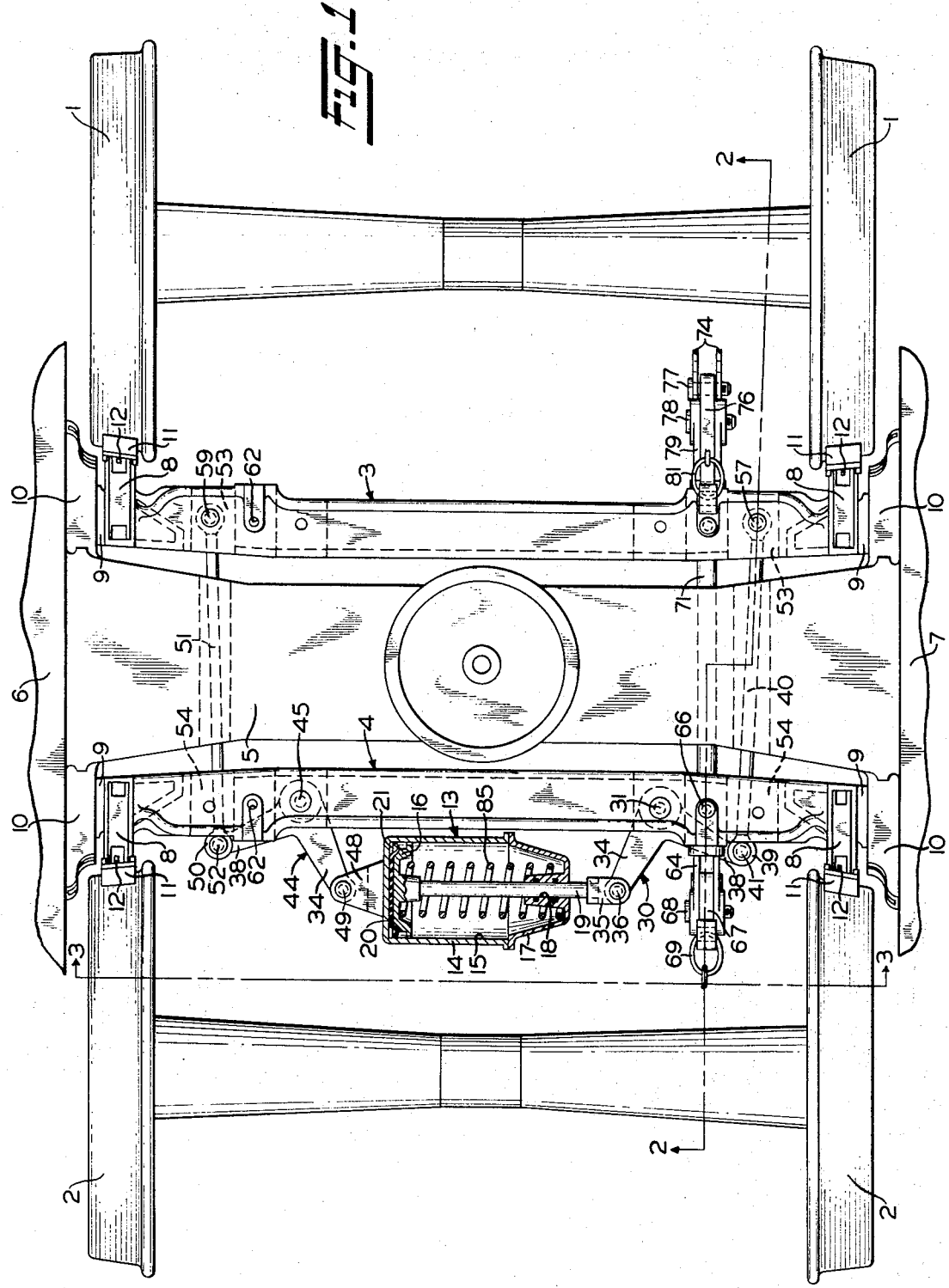
FIG. 1 is a plan view, in outline, of a brake rigging for a two-axle four-wheel car truck, embodying the invention.

Referring to FIG. 1 of the drawings, the reference numerals 1 and 2 designate respectively the wheels secured at opposite ends of each of two axles of a two-axle four-wheel railway car truck.

Figure 2:
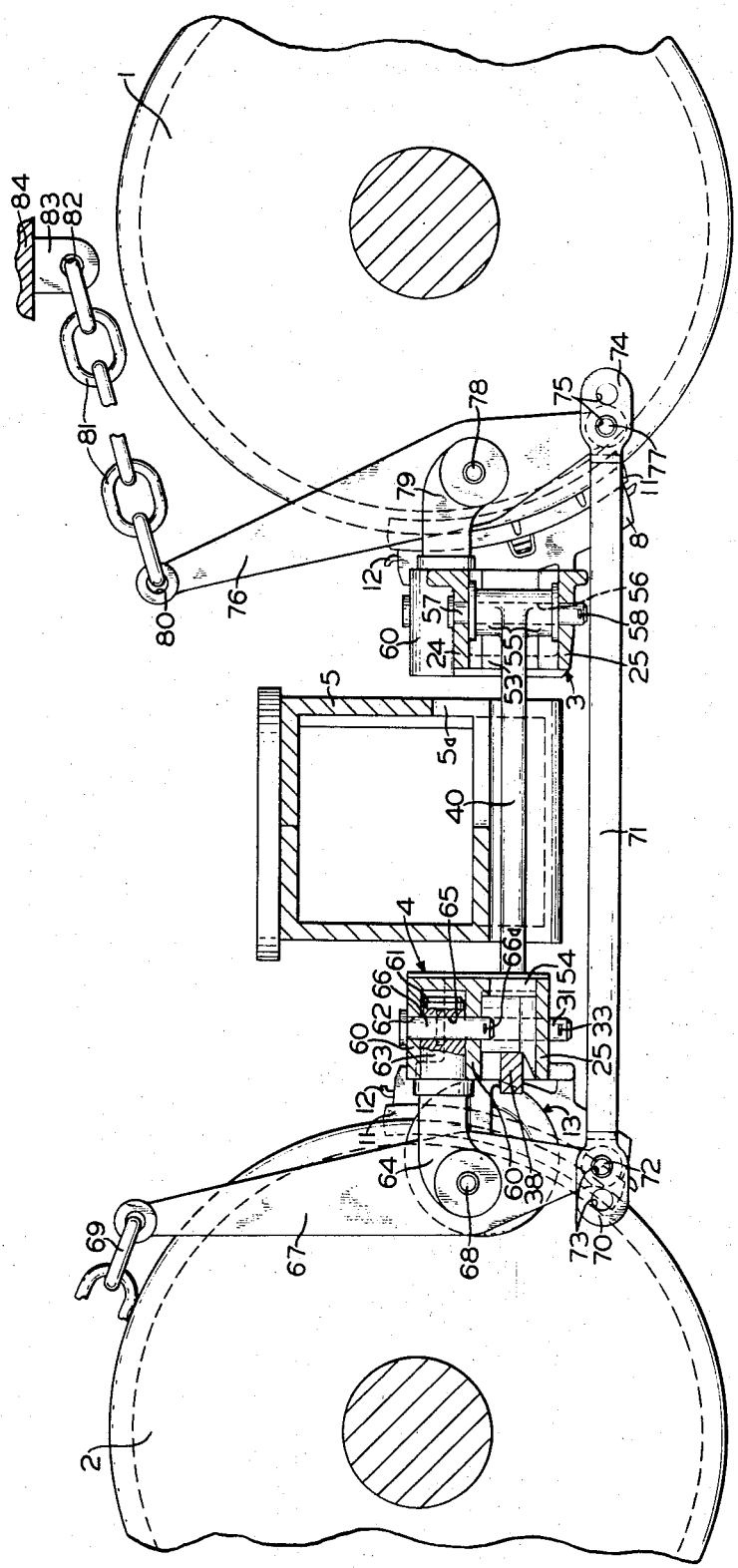
FIG. 2 is a vertical cross-sectional view, taken along the line 2—2 of FIG. 1 and looking in the direction of the arrows, showing a hand brake linkage and its relationship to the pneumatically-operated brake rigging.

The brake rigging shown in FIGS. 1 and 2 comprises a pair of brake beams 3 and 4 extending crosswise of the car truck and in parallel spaced relation to each other and to the truck bolster 5. The brake beams 3 and 4 are symmetrically arranged on opposite sides of the truck bolster 5 and are movably supported at each end on the side frame members 6 and 7 of the truck in the manner hereinafter described.

The brake beams 3 and 4 each have the shape of a standard channel, illustrated as a U-channel.

A brake head 8 is riveted or otherwise attached to each end of the brake beams 3 and 4 adjacent to and on the inboard side of a guide foot 9. Each foot 9 is a flat L-shaped metal member, one leg of which extends between the flanges of the brake beam and is suitable secured thereto. The other leg of this guide foot 9 is slidably supported in a grooved wear plate and guide member 10, this wear plate and guide member being secured to the corresponding one of the truck side frame members 6 and 7. The wear plate and guide members and the guide feet serve to support the brake beams 3 and 4 at the proper height above the rails, (that is, somewhat below the horizontal diameter of the wheels) the groove in the wear plate and guide member 10 being at a slight angle to the horizontal to permit bodily movement of said brake beams in a direction radially of the associated wheels when a brake application is made.

Each brake head 8 carries a composition brake shoe 11 for contact with the tread surface of an associated wheel. In customary manner the shoe has a backing plate provided with a key bridge to receive a key 12 for removably locking the shoe to the brake head 8.

The brake shoes 11 are operated into and out of contact with their associated wheels 1, 2 by means of a fluid pressure motor or brake cylinder device 13.

The brake cylinder 13 comprises a cup-shaped body 14 having a bore 15 in which a piston 16 is slidably mounted. The outer end of the bore 15 is closed by a non-pressure head 17 that is secured to the open end of the body 14 by any suitable means (not shown). This non-pressure head 17 has therein a bore 18 through which a piston rod 19 extends, the upper end of which, as viewed in FIG. 1, is integral with the piston 16.

A packing cup 20 is secured to the upper side, as viewed in FIG. 1, of the piston 16 and cooperates with the cup-shaped body 14 to form a pressure chamber 21 to which fluid under pressure may be supplied via a hose 22 (FIG. 3) and a pipe connection 23 by operation of the brake control valve device of the usual air brake equipment on railway cars under the control of the operator.

Each of the brake beams 3 and 4 may be in the form of a cast U-channel member. It will be noted from FIG. 3 that the upper and lower flanges 24 and 25 of these brake beams are provided with a first pair of oppositely arranged and inwardly facing bosses 26 and 27 that are located on the right-hand side, as viewed in FIG. 3, of the longitudinal center line of the car truck, and a second pair of oppositely arranged and inwardly facing bosses 28 and 29 that are located on the left-hand side of this center line.

As shown in FIGS. 1 and 3, a first bell-crank lever 30 is rockably mounted on a headed pin 31 that extends through a bore 32 in this lever 30 and has its opposite ends anchored in coaxial bores provided therefore in the bosses 26 and 27 formed integral with the brake beam 4. A cotter pin 33 serves to retain the headed pin 31 in place. The outer end of one arm 34 of this bell-crank lever 30 is disposed between the jaws of a clevis 35 carried on the exterior end of piston rod 19 and operatively connected to this clevis by a headed pin 36 that extends through a bore in the arm 34 and has its opposite ends anchored in coaxial bores provided therefor in the jaws of this clevis 35. A cotter pin 37 prevents removal of pin 36 as the result of vibration.

The outer end of the other arm 38 of the bell-crank lever 30 is disposed between the jaws of a clevis 39 formed at the left-hand end, as viewed in FIG. 1, of a push rod or link 40 and operatively connected thereto by a headed pin 41 that extends through a bore 42 in this arm 38 and has its opposite ends anchored in coaxial bores provided therefor in the jaws of this clevis 39. This pin 41 is retained in place by a cotter pin 43.

A second bell-crank lever 44, identical in construction to the bell-crank lever 30, is rockably mounted on a headed pin 45 that extends through a bore 46 (FIG. 3) in this lever 44 and has its opposite ends anchored in coaxial bores provided in the bosses 28 and 29 (FIG. 3). This pin 45 is retained against loss as the result of vibration by a cotter pin 47. Since the bell-crank levers 30 and 44 are identical in construction, corresponding parts are denoted by the same reference numerals. Accordingly, the arm 34 of the bell-crank lever 44 is pivotally connected to a clevis 48 formed integral with the brake cylinder body 14 by a headed pin 49, and the arm 38 is pivotally connected to a clevis 50 formed at the left-hand end (FIG. 1) of a second push rod or link 51 by a headed pin 52.

The brake beam 3 is provided with a pair of spaced-apart windows 53 one disposed on each side of the longitudinal center line of the car truck. Likewise, the brake beam 4 is provided with a pair of spaced-apart windows 54, it being noted that one of each of these two pair of windows appears in FIG. 2 of the drawings.

As shown in FIGS. 1 and 2 of the drawings, the push rods 40 and 51 are disposed in substantially parallel relationship. These push rods 40 and 51 extend through the windows 54 in the brake beam 4, beneath the bolster 5 and through the windows 53 in the brake beam 3. As shown in FIG. 3, the opposite vertical walls and sloped bottom of the bolster 5 are provided with a pair of spaced-apart cut-out portions 5a and 5b to prevent the bolster from being moved into contact with the push rods 40 and 51 when the car is fully loaded, it being understood that the opposite ends of the bolster 5 are supported on the car springs (not shown) which are compressed in response to the load placed on the car so that the bolster is moved downward from the position shown in FIG. 3.

As shown in FIG. 2, the right-hand end of the push rod 40 has a boss 55 formed integral therewith and provided with a bore 56 that is coaxial with bores in the upper and lower flanges 24 and 25 of the brake beam 3. A headed pin 57 extending through these coaxial bores and carrying a cotter pin 58 adjacent its lower end operatively connects the push rod 40 to the brake beam 3. The push rod 51 is likewise operatively connected to the brake beam 3 by a headed pin 59 (FIG. 1).

As shown in the drawings, the length of the two arms of the bell-crank levers 30 and 44 are equal. Consequently, the force transmitted to each of the push rods 40 and 51 by one arm of the respective bell-crank lever is the same as the force transmitted to the respective other arm by the brake cylinder body 14 or the piston rod 19. It should be noted, however, that a multiplication of forces can be effected by making the arm of each bell-crank lever that is connected to the respective push rod shorter than the other arm.

Moreover, it should be noted that the brake cylinder 13 is disposed transversely between the side frames 6 and 7 of the truck or parallel to the brake beams 3 and 4. By so locating the brake cylinder 13, the length of the brake cylinder body 14 and therefore the length of the bore 15 therein may be so chosen or selected that this length is such as to provide sufficient travel for the piston 16 in addition to that required to effect contact of the brake shoes 11 with the tread surface of the corresponding wheels, that as these brake shoes wear away, the shoes are always properly moved into braking contact with the tread surfaces of the wheels of the truck during each brake application throughout their useful life without the necessity of a slack adjuster to compensate for wear of the shoes.

In order to provide in customary fashion or operation of the beams 3 and 4 by hand brake means, the upper flange 24 of each of these brake beams has formed integral therewith a pair of spaced-apart bosses 60, as best shown in FIGS. 2 and 3. These bosses 60 on each brake beam, as shown in FIG. 2 are each provided with a bottomed bore 61 and a through bore 62, it being noted that the axes thereof intersect and form a right angle.

As shown in FIG. 2, disposed in the bottomed bore 61 of one of the bosses 60 on the brake beam 4 is a cylindrical member 63 that is formed at one end of a clevis 64. This cylindrical member 63 is provided with a bore 65 that has substantially the same diameter as the bores 62 in the bosses 60 whereby the clevis 64 is secured to the brake beam 4 by a headed pin 66 that extends through the bores 62 and 65 and has its opposite ends anchored in the bore 62 of the boss 60. A cotter pin 66a prevents loss of a pin 66 by vibration Disposed between the jaws of the clevis 64 carried by the brake beam 4 is a first hand brake lever 67 that is pivotally mounted intermediate its ends on a pin 68 the opposite ends of which are anchored in the opposite jaws of this clevis 64. The upper end of the lever 67 may be connected by a chain 69 to the hand brake wheel (not shown) which is located at one end of a railway car. The lower end of this lever 67 is disposed between the jaws of a clevis 70 formed at the left-hand end of a hand brake push rod or link 71 and operatively connected thereto by a pin 72 that extends through a bore provided therefor in the lever 67 and has its opposite ends anchored in one of a pair of spaced-apart bores 73 in the jaws of this clevis 70.

As best shown in FIG. 2, the hand brake push rod 71 extends beneath the brake beams 3 and 4 and the truck bolster 5 and has formed at its right-hand end a clevis 74 in the jaws of which are provided a pair of spaced-apart bores 75.

The lower end of a second hand brake lever 76 is disposed between the jaws of the clevis 74 and is operatively connected thereto by a pin 77 that extends through a bore provided therefor in this lever 76 and has its opposite ends anchored in one of the bores 75.

It should be noted that the purpose of providing a pair of spaced-apart bores adjacent each end of the hand brake push rod 71 is to enable adjusting the length of this push rod to compensate for wheel wear.

The second hand brake lever 76 is pivotally mounted on a pin 78 that has its opposite ends anchored in the jaws of a clevis 79 that is carried by the brake beam 3 in the same manner as the clevis 64 is carried by the brake beam 4.

As hereinbefore stated, the upper end of the hand brake lever 67 is connected by the chain 69 (FIG. 2) to the hand brake wheel (not shown) which is located at one end of a railway car. Furthermore, so that the brake shoes 11 carried by the brake heads 8, which are integral with the brake beam 4, may be forced against the tread surface of the wheels 2, subsequent to movement of the brake shoes 11 carried by the brake heads 8 of the brake beam 3 into braking contact with the tread surface of the wheels 1, by force transmitted from the hand brake wheel to the brake beam 3 via the chain 69, lever 67, push rod 71 and lever 76, the upper end of this lever 76 is provided with a bore 80 through which passes the link at one end of a chain 81. The link at the opposite end of this chain 81 passes through a bore 82 provided in a lug 83 that is integral with the bottom of the car body 84, the chain 81 thus serving to connect or anchor the hand brake lever 76 to the car body 84.

OPERATION

In operation, when it is desired to effect a brake application, fluid under pressure is admitted to the chamber 21 (FIG. 1) by operation of the brake control valve device of the usual air brake equipment on railway cars under the control of the operator. Fluid under pressure thus supplied to the chamber 21 of the brake cylinder 13 is effective to move the piston 16 and the body 14 simultaneously in opposite directions. As the piston 16 and the brake cylinder body 14 are moved in opposite directions, the piston 16 is effective, via the piston rod 19, clevis 35, and pin 36, to rock the bell-crank lever 30 counterclockwise, as viewed in FIG. 1, about the pin 31. This counterclockwise rocking of the bell-crank lever 30 about the pin 31 is effective to move the push rod 40 in the direction of the right-hand, as viewed in FIG. 1. Simultaneously, the brake cylinder body 14 is effective, via clevis 48 and pin 49, to rock the bell-crank lever 44 clockwise, as viewed in FIG. 1, about the pin 45. This clockwise rocking of the bell-crank lever 44 about the pin 45 is effective to move the push rod 51 in the direction of the right hand, as viewed in FIG. 1.

Since the push rod 40 is connected to the brake beam 3 by the pin 57 and the push rod 51 is connected to this beam 3 by the pin 59, it is apparent that the above-mentioned simultaneous movement of the push rods 40 and 51 in the direction of the right hand, as viewed in FIG. 1, is effective to move the brake beam 3 and the brake shoes 11 carried thereby toward the wheels 1 so that these shoes are brought into braking contact with the tread surface of these wheels.

After the brake shoes 11 carried by the brake beam 3 are brought into braking contact with the tread surface of the wheels 1, it is apparent that the brake beam 3 and the push rods 40 and 51 cannot be moved further in the direction of the right hand, as viewed in FIG. 1.

When the push rods 40 and 51 can no longer be moved in the direction of the right hand, the pin 41 becomes a fixed fulcrum for the bell-crank lever 30, and the pin 52 becomes a fixed fulcrum for the bell-crank lever 44. Accordingly, the fluid pressure force now transmitted from the piston 16 to the arm 34 of the bell-crank lever 30, via the piston rod 19, clevis 35 and pin 36, is effective to rock this bell-crank lever 30 counterclockwise about the pin 41. Likewise, the fluid pressure force now transmitted from the brake cylinder body 14 to the arm 34 of the bell-crank lever 44, via the clevis 48 and pin 49, is effective to rock this bell-crank lever 44 clockwise about the pin 52.

Since the bell-crank lever 30 is operatively connected to the brake beam 4 by the pin 31, and the bell-crank lever 44 is operatively connected to this brake beam by the pin 45, it is apparent that the above-mentioned simultaneous counterclockwise rocking of the bell-crank lever 30 about the pin 41 and clockwise rocking of the bell-crank lever 44 about the pin 52 is effective, via the pins 31 and 45, to move the brake beam 4 in the direction of the left hand, as viewed in FIG. 1, until the brake shoes 11 carried by this brake beam 4 are brought into braking contact with the tread surface of the wheels 2.

As the brake beams 3 and 4 are moved, as described above, these beams are supported and guided by the guide feed 9 as each of these feet has sliding contact in the groove in a corresponding wear plate and guide member 10. As hereinbefore mentioned, the orientation of the wear plates and guide members 10 is such that the brake beams 3 and 4 and the brake shoes 11 carried thereby are moved substantially radially toward the wheels.

It will be understood that, in view of the symmetrical disposition of the brake beams 3 and 4 on the opposite sides of the truck bolster 5, and since the area of the piston 16 and the cup-shaped end of the brake cylinder body 14 are the same, the supply of fluid under pressure to the chamber 21 will now produce substantially equalized forces of application of all the brake shoes on the wheels.

When it is desired to release the brake application, the fluid under pressure previously supplied to the chamber 21 is vented in the usual manner through operation of the brake control valve device of the car brake equipment under the control of the operator, whereupon the force of a release spring 85 (FIG. 1), interposed between the piston 16 and the non-pressure head 17, moves the brake cylinder body 14 and the piston 16 in a brake releasing direction to move the brake beams 3 and 4 toward each other and the brake shoes 11 carried thereby away from the tread surface of the wheels to a normal clearance position with respect to the tread surface of the wheels to effect a brake release.

Due to the inclination of the grooves in the wear plate and guide members 10, the brake beams tend to return by action of gravity to their normal symmetrical relation with respect to the truck bolster 5, in which position the clearance between the brake shoes on one brake beam and their associated wheels is substantially equal to the clearance between the brake shoes on the other brake beam and their associated wheels. However, due to the predominating weight of the brake beam 4 which carries the weight of the brake cylinder 13, via the bell-crank levers 30 and 44 and the pins 31 and 45, over the weight of the brake beam 3 which carries no brake cylinder, the tendency is for the brake beam 4 to travel by action of gravity, upon the release of fluid under pressure from the chamber 21 of the brake cylinder 13, further down the inclined grooves of the wear plate and guide members and thus past the normal intended release position. Therefore, in order to limit the travel of the heavier of the two brake beams toward its release position, each wear plate and guide member 10 has the groove therein closed at its lower end. This closed end of the grooves consequently serves as limit stops to movement of the guide feet 9 of brake beam 4 toward the bolster 5.

It will be noted that it is not necessary to use a slack adjuster with this type of brake rigging. It should be understood that the length of the bore 15 in the cup-shaped body 14 of the brake cylinder 13 is such as to provide sufficient travel for piston 16 in addition to that required to effect contact of the brake shoes with the tread surface of the wheels, that as the brake shoes 11 wear away, the shoes are always properly moved into braking contact with the tread surface of the wheels of a truck during each brake application throughout their useful life without the necessity of a slack adjuster to compensate for wear of the brake shoes, the slightly increased volume of displacement of the piston 16 in brake cylinder 13 being so small as not to be reflected in an appreciably lower pressure of equalization therein.

Let it be supposed that the brakes are released and a trainman desires to effect a manual or hand brake application on a two-axle four-wheel car truck provided with the brake rigging constituting the present invention. To effect a manual brake application on the two-axle four-wheel car truck, the trainman will manually rotate the hereinbefore-mentioned hand brake wheel to which the chain 69 (FIG. 2) is connected to cause the application of a pull or force to this chain 69 in the direction of the left hand, as viewed in FIGS. 1 and 2. The pull or force thus exerted on the chain 69 is transmitted to the first hand brake lever 67 and is effective to rock this lever counterclockwise, as viewed in FIG. 2, about the pin 68 which pivotally mounts this lever 67 on the brake beam 4. As the lever 67 is thus rocked counterclockwise about the pin 68, it is effective to transmit a thrust or pushing force to the hand brake push rod 71. This push rod 71 is connected to the second hand brake lever 76 by the clevis 74 and pin 77. Consequently, it can be seen from FIG. 2 that the thrust or pushing force transmitted to the push rod 71 acts in the direction of the right hand.

Accordingly, the thrust or pushing force transmitted to the lower end of the second hand brake lever 76 acts thereon in the direction to rock this lever 76 counterclockwise, as viewed in FIG. 2, about its connection with the left-hand end of the chain 81. This counterclockwise rocking of the second hand brake lever 76 is effective to move the brake beam 3 in the direction of the right hand, as viewed in FIGS. 1 and 2, since the pin 78 and clevis 79 operatively connect this lever 76 to the brake beam 3. Accordingly, the brake beam 3 is thus moved in the direction of the right hand, as viewed in FIGS. 1 and 2, until the brake shoes 11 carried by this beam 3 are brought into braking contact with the tread surface of the wheels. 1.

It will be apparent that the brake beam 3 can move no further in the direction of the right hand, as viewed in FIGS. 1 and 2, upon engagement of the brake shoes 11 carried by this brake beam with the tread surface of the wheels 1. It will be further apparent that the hand brake push rod 71 cannot be moved in the direction of the right hand subsequent to engagement of the brake shoes 11 carried by the brake beam 3 with the tread surfaces of the wheels 1. Therefore, the pin 72 (FIG. 2) now becomes the fulcrum member for the first hand break lever 67 and this lever is thereafter rocked counterclockwise, as viewed in FIG. 2, about the pin 72 by the pull or force acting in the direction of the left hand on the chain 69 in response to rotation of the hand brake wheel by the trainman. Since the lever 67 is operatively connected by the pin 68, clevis 64 and pin 66 to the brake beam 4, this counterclockwise rocking of the lever 67 about the pin 72 is effective to cause the brake beam 4 to be moved in the direction of the left hand, as viewed in FIGS. 1 and 2, until the brake shoes 11 carried by this brake beam 4 are brought into braking contact with the tread surface of the wheels 2.

It should be noted that, as the brake beam 4 is thus moved in the direction of the left hand, as viewed in FIGS. 1 and 2, subsequent to movement of the brake shoes 11 carried by brake beam 3 into engagement with the tread surface of the wheels 1, the push rod 40 is effective, via the pin 41, to rock the bell-crank lever 30 counterclockwise about the pin 31, as viewed in FIG. 1, and the push rod 51 is effective, via the pin 52, to rock the bell-crank lever 44 clockwise about the pin 45. Since the arm 34 of the bell-crank lever 30 is connected to the clevis 35 by the pin 36, and the arm 34 of the bell-crank lever 44 is connected to the clevis 48 by the pin 49, it is apparent that as the brake beam 4 is moved in the direction of the left hand, as viewed in FIGS. 1 and 2, to bring the brake shoes 11 carried by this brake beam 4 into engagement with the tread surface of the wheels 2, the piston 16 and brake cylinder body 14 will be moved in opposite directions to thereby increase the volume of the chamber 21.

While the fluid pressure brakes are released, the chamber 21 is open to atmosphere via elbow fitting 23, hose 22 and the service portion of the usual brake control valve device on the car. Consequently, as the piston 16 and brake cylinder body 14 are moved in opposite directions to increase the volume of the chamber 21 upon the trainman effecting a manual brake application by rotating the usual hand brake wheel, fluid from the atmosphere at atmospheric pressure flows into this chamber 21 so that no subatmospheric pressure or vacuum is formed therein.

The manual brake application can be released by the trainman rotating the hand brake wheel at the end of the car in the direction to release the pull on the chain 69. When the tension or pull on the chain 69 is thus removed, the brake beams 3 and 4 and the brake shoes 11 carried thereby will be returned by gravity and the spring 85 to the brake release position in the manner hereinbefore described.

It should be noted that, subsequent to effecting a pneumatic or power brake application, a trainman may rotate the hand brake wheel in the direction to produce a pull on the chain 69 which acts in the direction of the left hand, as viewed in FIGS. 1 and 2. If now the hand brake wheel be locked against rotation by some suitable locking means (not shown), the brakes will remain applied to a degree in accordance with the pull or force acting in the direction of the left hand on the chain 69 even if all the fluid under pressure in the chamber 21 of the brake cylinder 13 is lost by leakage therefrom.

Referring to FIG. 1 of the drawings, it is apparent that when a manual or hand brake application is effected, the brake shoes 11 carried adjacent the lower end of the brake beams 3 and 4 are pressed against the tread surface of their associated wheels with a greater degree of force than the brake shoes 11 carried adjacent the upper end of these brake beams are pressed against the tread surface of their associated wheels. However, a sufficient retardation force is exerted on the wheels of the truck to comply with the present regulations regarding hand brakes.

Having now described the invention, what I claim as new and desire to secure by Letters Patent, is:

1. A brake rigging for a four-wheel type of vehicle truck having a transverse axis, a longitudinal axis perpendicular thereto, and a bolster so disposed that its axis coincides with the transverse axis of the truck, said brake rigging including two brake beams extending in spaced substantially parallel relation to the transverse axis of the truck, and guidably supported on the truck for bodily movement longitudinally of the truck, wherein the improvement comprises:
   a. a pair of spaced-apart fulcrum mounting means formed integral with each of said brake beams,
   b. a pair of bell-crank levers each having a pair of arms,
   c. a pair of fulcrum members, each having one of said pair of bell-crank levers rockable thereon and being anchored in one of said pair of fulcrum mounting means on one of said brake beams,
   d. a brake cylinder casing having its longitudinal axis arranged parallel to the transverse axis of said truck and being pivotally connected to one arm of one of said bell-crank levers, and
   e. a piston operable in said brake cylinder casing and cooperating therewith to form a pressure chamber to which fluid under pressure may be supplied to respectively exert forces acting in opposite directions on said piston and said casing, said piston having a piston rod movable therewith substantially transversely of the truck and being operable connected to one arm of the other of said bell-crank levers, and
   f. a pair of links connected respectively at one end to the other arm of said bell-crank levers and at the other end in spaced-apart relation to the other of said brake beams, said links, bell-crank levers, brake cylinder casing and piston cooperating to transmit the fluid pressure force acting on said casing and said piston to said brake beams whereby said force effects movement of said other brake beam in one direction to a brake applying position with respect to a corresponding pair of wheels of the truck, and thereafter cooperating to transmit said fluid pressure force to said one brake beam to effect movement thereof in a direction opposite said one direction to a brake applying position with respect to the other pair of wheels of the truck.

2. A brake rigging for a four-wheel type of vehicle truck, as recited in claim 1, further characterized in that said pair of arms of said pair of bell-crank levers are of equal length to enable transmittal of equal forces through the bell-crank levers.

3. A brake rigging for a four-wheel type of vehicle truck, as recited in claim 1, further characterized in that one of said pair of arms of each of said bell-crank levers is longer than the other arm to enable a multiplication of force transmitted through the bell-crank levers.

4. A brake rigging for a four-wheel type of vehicle truck, as recited in claim 1, further characterized in that each of said brake beams comprises a U-shaped channel member having a pair of parallel spaced-apart flanges and a web integrally connecting one edge of one flange with the corresponding edge of the other flange, and in that each of said flanges has formed integral therewith on the side thereof adjacent the other flange a pair of spaced apart bosses, each boss of each pair of oppositely disposed bosses being provided with a bore coaxial with the bore in the other boss of the respective pair of oppositely disposed bosses, each pair of oppositely disposed bosses and the coaxial bores therein constituting one of said pair of spaced-apart fulcrum mounting means.

5. A brake rigging for a four-wheel type of vehicle truck, as recited in claim 1, further characterized in that said two bell-crank levers are so disposed that their pair of arms move in a substantially horizontal plane, and in that said pair of links extend longitudinally in parallel spaced-apart relationship and move in a substantially horizontal plane.

6. A brake rigging for a four-wheel type of vehicle truck, as recited in claim 1, further characterized by a pair of hand brake members respectively pivotally mounted intermediate their ends on said two brake beams, and by a hand brake link pivotally connected at one end to one end of one of said pair of hand brake members and at its opposite end to one end of the other of said pair of hand brake members, the other end of said other hand brake member being anchored against movement so that a manual brake application can be effected in response to the application of a manual force to the other end of said one hand brake member.

7. A brake rigging for a four-wheel type of vehicle truck, as recited in claim 1, further characterized in that each of said brake beams comprises a U-shaped channel member having a pair of parallel spaced-apart flanges and a web integrally connecting one edge of one flange with the corresponding edge of the other flange, said one flange and said web having formed integral therewith at least one boss provided with a bottomed bore, and in that a hand brake lever fulcrum means comprising a clevis having a cylindrical member at one end disposed in said bottomed bore and a pair of jaws at the other is removably mounted on each of said brake beams.

8. A brake rigging for a four-wheel type of vehicle truck, as recited in claim 1, further characterized in that each of said brake beams comprises:

a. a U-Shaped channel member having a pair of parallel spaced-apart flanges and an integral web connecting one edge of one flange with the corresponding edge of the other flange, b. a pair of spaced-apart bosses formed integral with each of said flanges on the side thereof adjacent the other flange and coaxial with the spaced-apart bosses on the other flange, each boss being provided with a bore that is coaxial with the bore in the corresponding boss on the other flange whereby each pair of oppositely disposed bosses and the coaxial bores therein constitute one of said pair of spaced-apart fulcrum mounting means, and c. a boss disposed on the side of each of said pair of spaced-apart bosses opposite that of the other of said pair of spaced-apart bosses, said boss being integral with one of said parallel spaced-apart flanges and said web and provided with a bottomed bore the axis of which is parallel to said spaced-apart flanges and a through bore that opens at one end at the top surface of said one flange, said bottomed bore and said through bore being so disposed that their axes intersect and form a right angle.

9. A brake rigging for a four-wheel type of vehicle truck, as recited in claim 1, further characterized in that said brake cylinder casing is disposed on one side of said one brake beam and said bolster is disposed on the other side of said one brake beam.

10. A brake rigging for a four-wheel type of vehicle truck, as recited in claim 1, further characterized in that each of said brake beams comprises a U-shaped channel member having a pair of parallel spaced-apart flanges and a web integrally connecting one edge of one flange with the corresponding edge of the other flange, said one flange and said web having formed integral therewith a pair of spaced-apart bosses each of which is provided with a bottomed bore, and in that a hand brake lever fulcrum means comprising a clevis having a cylindrical member at one end disposed in the bottomed bore in one of said spaced-apart bosses and a pair of jaws at the other is removably mounted on each of said brake beams.

11. A brake rigging for a four-wheel type of vehicle truck, as recited in claim 5, further characterized in that said pair of links are so disposed as to extend beneath the bolster in spaced-apart relation thereto.

12. A brake rigging for a four-wheel type of vehicle truck, as recited in claim 6, further characterized in that said hand brake link extends beneath the bolster in spaced-apart relation thereto.

* * * * *

UNITED STATES PATENT OFFICE
CERTIFICATE OF CORRECTION

Patent No. 3,780,837     Dated   December 25, 1973

Inventor(s)   Andrew G. Haydu

It is certified that error appears in the above-identified patent and that said Letters Patent are hereby corrected as shown below:

Column 10, line 42, "operable" should be --operably--

Column 11, line 23, after "in", second occurrence, insert --substantially--

Signed and sealed this 23rd day of July 1974.

(SEAL)
Attest:

McCOY M. GIBSON, JR.          C. MARSHALL DANN
Attesting Officer             Commissioner of Patents